United States Patent [19]

O'Connor

[11] Patent Number: 4,466,595
[45] Date of Patent: Aug. 21, 1984

[54] CAMERA LOCK-PLATE ASSEMBLY

[76] Inventor: Chadwell O'Connor, 2024 Galaxy Dr., Newport Beach, Calif. 92660

[21] Appl. No.: 275,811

[22] Filed: Jun. 22, 1981

[51] Int. Cl.³ ............................................ F16M 13/00
[52] U.S. Cl. .................................... 248/558; 248/187
[58] Field of Search ............... 248/154, 187, 310, 558, 248/670, 680, 681, 207, 512

[56] References Cited

U.S. PATENT DOCUMENTS

| | | | |
|---|---|---|---|
| 454,553 | 6/1891 | Whitten | 248/207 X |
| 1,021,037 | 3/1912 | Buffum | 248/310 |
| 1,049,974 | 1/1913 | Bailie | 248/310 |
| 2,448,752 | 9/1948 | Wagner | 248/512 |
| 2,911,700 | 11/1959 | Wieland | 248/310 X |
| 2,962,135 | 11/1960 | White | 248/187 X |
| 2,962,251 | 11/1960 | Karpf | 248/183 |
| 4,316,592 | 2/1982 | Jett | 248/187 |

FOREIGN PATENT DOCUMENTS 2852034  7/1979  Fed. Rep. of Germany ...... 248/558

Primary Examiner—William H. Schultz
Attorney, Agent, or Firm—Leydig, Voit, Osann, Mayer & Holt, Ltd.

[57] ABSTRACT

A camera lock-plate assembly having an elongated base plate to be secured to a camera and a support body with an upper surface slidably receiving the plate with a tongue-in-groove connection between tapered ways on the plate and lugs on the body. The lug on one side of the body is movable both down against spring bias, so that the plate can be simply lowered into position with the movable lug snap locking into position, and then moved toward the fixed lugs, so that the plate can be manually clamped in place. The plate can be adjustably slid to position the weight of the camera by unclamping, but not unlocking, the movable lug.

6 Claims, 5 Drawing Figures

CAMERA LOCK-PLATE ASSEMBLY

This invention relates generally to camera hold-down assemblies such as those used to secure a camera to a tripod, and more particularly concerns a quick-lock, quick-release assembly of this kind.

Film and television cameras are customarily mounted on panheads supported by tripods, pedestals or the like. The panhead normally has an upper instrument support plate and, for convenience in securing the camera to the panhead, quick-released devices are often interposed between the camera base and the support plate. Such devices usually have one elements secured to the camera and a second element secured to, or in some cases forming, the support plate with the elements being interfitting and lockable.

Lock-plate assemblies of this kind must be rigid and strong so as to firmly secure heavy cameras. To provide strength and rigidity, many prior devices utilize elements that require careful interfitting and manipulation of locking parts. When a heavy, bulky camera is being mounted, it is often difficult for the camera man to see and/or feel the locking device elements into proper mating engagement, and to thereafter properly manipulate the locking mechanism.

Accordingly, it is the primary aim of this invention to provide a camera lock-plate assembly that gives the user virtually no-look reliable operation with snap-in locking to initially secure the instrument.

Another object of the invention is to provide a lock-plate assembly as characterized above with relatively massive locking parts for strength and rigidity. A related object is to provide an assembly of the above kind with a quick-acting control that goes between rigid clamping and release position with only a small amount of manual movement.

A further object is to provide a device as referred to above that permits a wide range of balance adjustments fore and aft so as to compensate for changes in lenses or other special equipment on the camera. A collateral object is to provide a device of this character which permits such fore and aft adjustment upon unclamping, but not unlocking, the mating elements of the device so that there is no inadvertent separation.

Yet another object is to provide an assembly as referred to above that permits a wide range of handle positioning when handle shafts are coupled to the assembly for manual control of the mounted camera.

Other objects and advantages of the invention will become apparent upon reading the following detailed description and upon reference to the drawings, in which.

Figure 1:
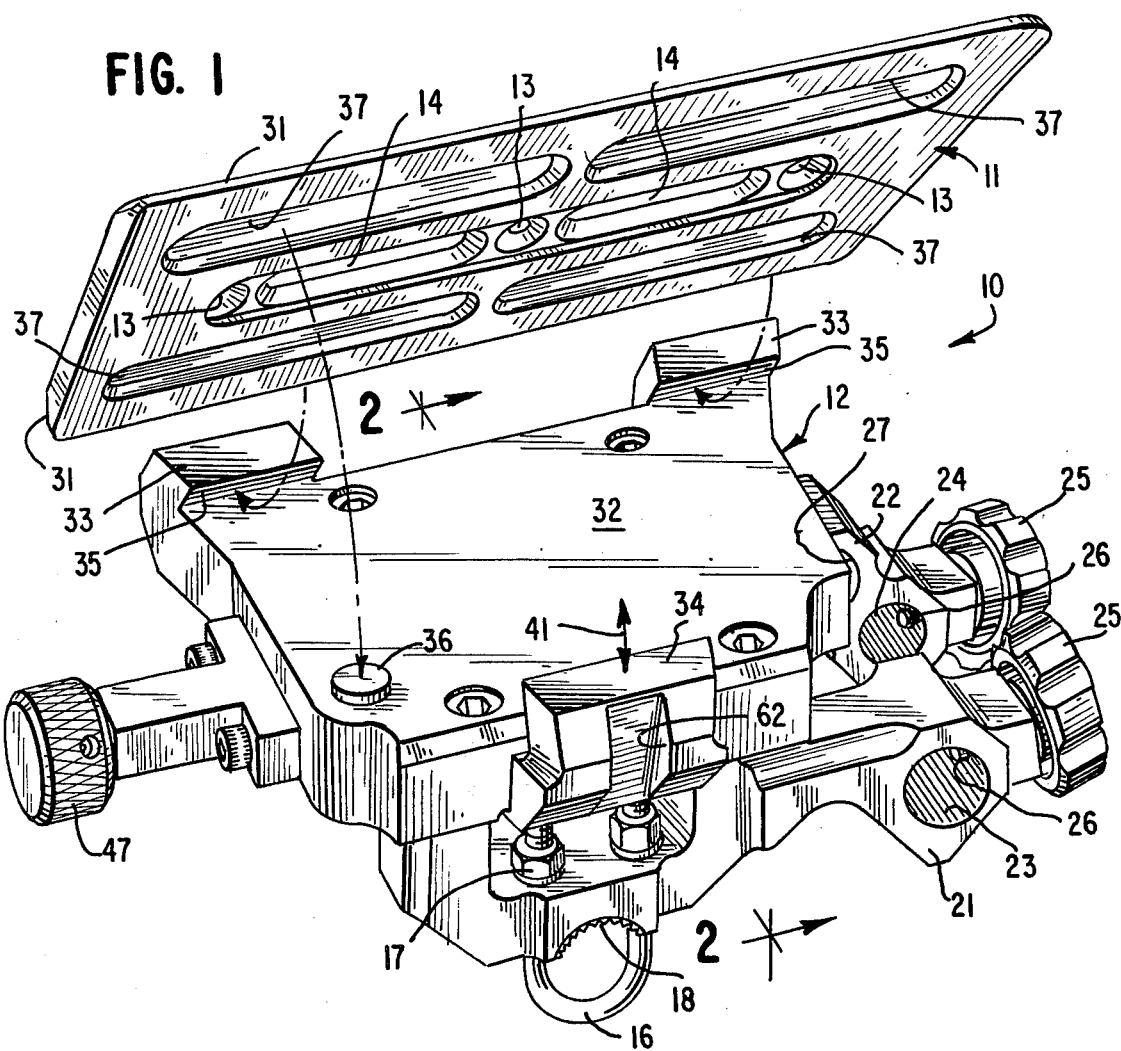
FIG. 1 is a perspective of an assembly embodying the invention with the base plate shown separated from the support body.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown an instrument lock-plate assembly 10 having a base plate 11 and a support body 12 embodying the invention and suitable for mounting heavy motion picture or television cameras on a panhead 60. The base plate 11 is elongated and adapted to be rigidly secured to the base of a camera or other instrument. For this purpose, the illustrated base plate is formed with three fore and aft spaced mounting holes 13 and a pair of mounting slots 14 so as to give considerable flexibility in mounting positions since any hole 13 in either slot 14 could be used to bolt the plate to the camera, with the camera axis running the length of the base plate 11.

The support body 12 is secured to the panhead 60 by a pair of U bolts 16 and nuts 17 that clamp serrated surfaces 18 to the mounting shaft 19 of the panhead in the usual fashion. The body 12 is formed with left and right lugs 21 and 22 having transverse mounting holes 23 and 24, respectively, for receiving the transverse portions of handle shafts. Handle locking knobs 25 are threaded into the body 12 so as to carry locking pins 26 into engagement with handle shafts fitted into the holes 23, 24.

Figure 4:
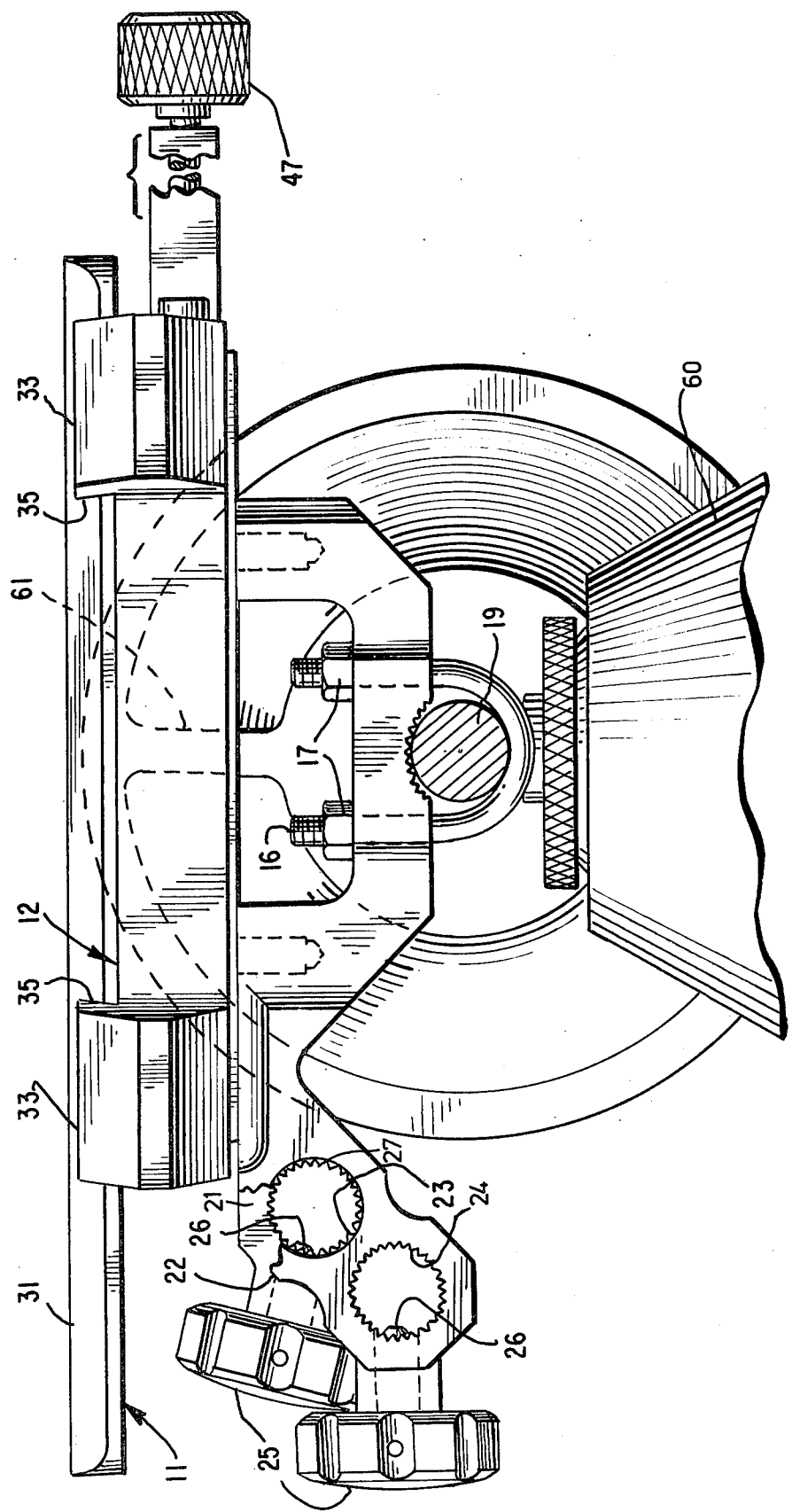
FIG. 4 is a slightly enlarged side elevation of the assembly shown in FIG. 1 with a fragmentary portion broken away to show both lugs in FIG. 4.

As a feature of the invention, the mounting holes 23, 24 have a diameter for receiving a handle shaft and are offset fore and aft a distance greater than the diameter of the holes so that handle shafts can be fitted from either left or right into either one of the holes 23, 24. If fitted from the left into the hole 24, the shaft would simply clear the rear of the lug 21. To permit a shaft to be fitted from the right into the hole 23, the lug 22 is formed with a nonserrated passage hole 27 on the axis of the hole 23 as seen in FIG. 4 which has a fragmentary portion of the lug 22 adjacent the opening 27 broken away to reveal a portion of the other lug 21 which has the serrated opening 23. The user of the assembly 10 thus has considerable flexibility in mounting one or two handles on the assembly and adjusting the handle or handles position.

In carrying out the invention, the base plate 11 has parallel tapered ways 31, and the support body 12 has an upper surface 32 for receiving the plate 11 and opposed lugs 33 and 34 with undercut surfaces 35 to engage the tapered ways 31 and define a tongue-in-groove mating engagement between the base plate and the support body. Assuming some looseness between the ways 31 and the lug surfaces 35, the plate 11 can slide fore and aft on the upper surface 32. To limit such movement, there is interfitting between a projection 36 on the support body 12 and a groove 37 on the base plate 11. The projection 36 is preferably at one end of the surface 32, and the plate 11 is formed with four grooves 37 symmetrically positioned so that the elongated plate can be mounted on the surface 32 aligned in either direction. Once mounted, the plate 11 can slide only the distance the projection 36 can move within one of the grooves 37.

Figure 5:
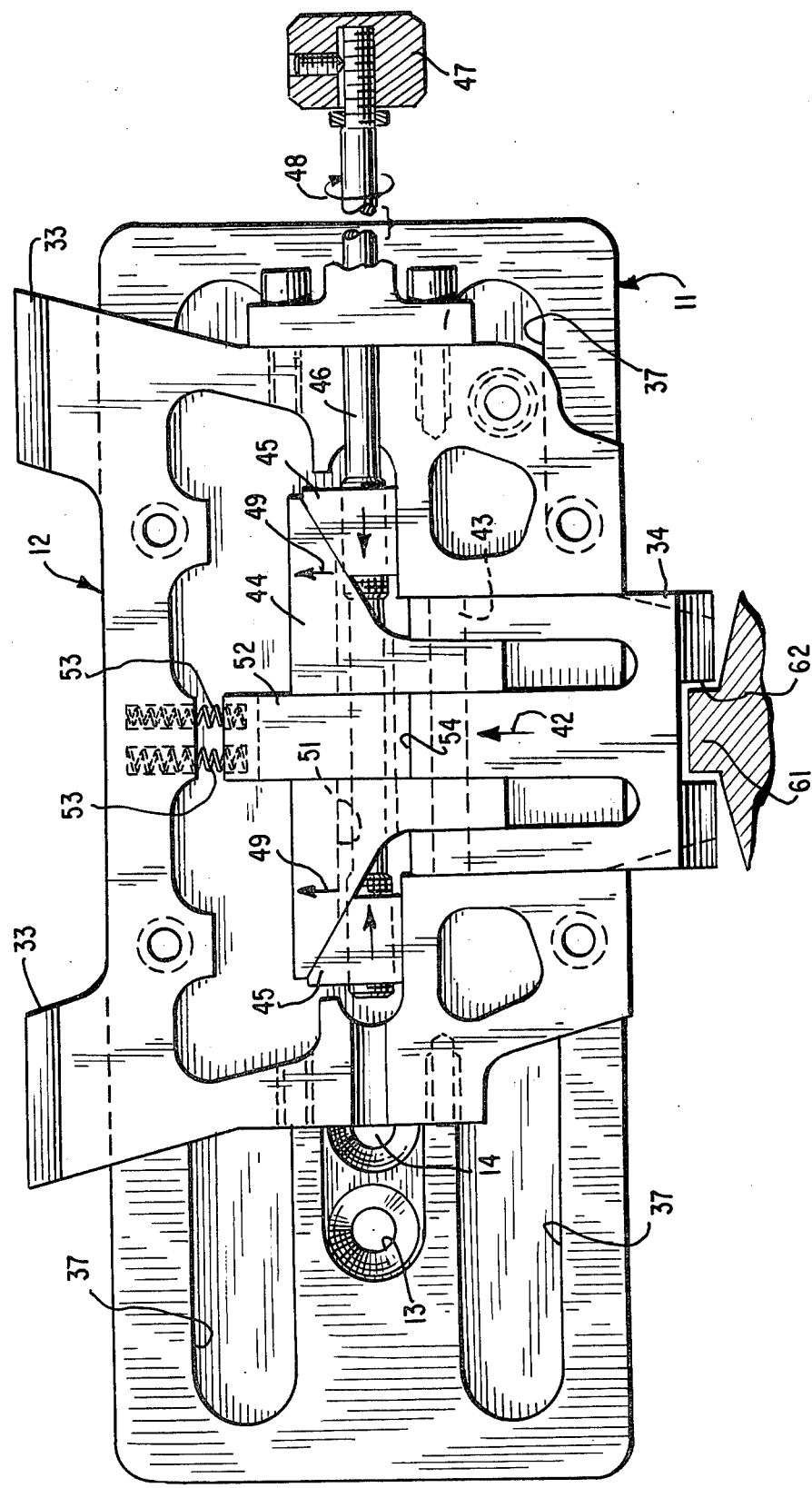
FIG. 5 is a bottom plan view of the assembly showing the mechanism within the support body.

In accordance with the invention, the lug 34 on one side of the support body 12 is movable, and is mounted for movement both down to the plane of the upper surface, along arrows 41, as well as above the upper surface toward the opposed lugs 34, along arrows 42 (see also FIG. 5). The lug 34 is biased up from the plane of the surface 32 so that the base plate 11 can engage the fixed lugs 33, press the movable lug 34 down against its bias, and have the lug 34 snap above the adjacent way 31 to lock the plate on the body. The lug 34 is also manually movable toward the opposed lugs 33 so as to clamp the base plate 11 between the lugs 33, 34 and against the body upper surface 32.

In the illustrated embodiment, the lug 34 is pivoted by a pin 43 on a member 44 slidably mounted in the body 12. The lug 34 is moved in the direction of the arrows 42 by a pair of wedges 45 on an oppositely threaded shaft 46 carrying a manually turned knob 47. The wedges 45 slide between aligned surfaces on the body 12 and tapered surfaces on the member 44 so that rotating the knob 47 in the direction of the arrow 48 draws the wedges 45 together so as to slide the member 44 in a straight line in the direction of the arrows 49, thereby pulling the movable lug 34 into clamping position against the base plate 11. The shaft 46 passes through a slot 51 in the member 44, allowing the member clearance to shift. The threaded shaft 46 and wedge 45 arrangement provides a strong, solid clamping action, with no possible release from a back force being exerted on the lug 34.

Figure 2:
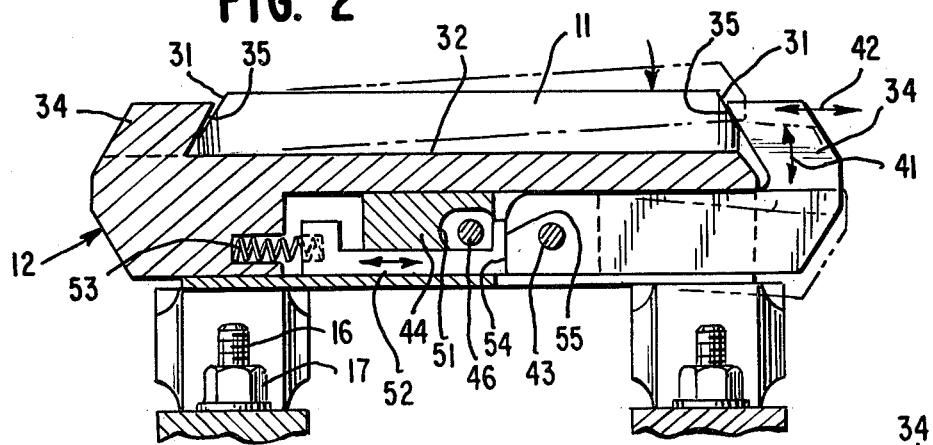
FIG. 2 is a fragmentary section taken approximately along the line 2—2 in FIG. 1.
Figure 3:
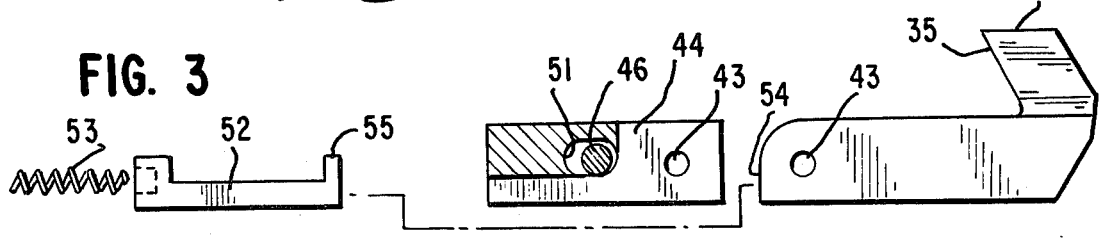
FIG. 3 is an exploded view of certain of the parts appearing in FIG. 2.

The lug 34 is biased through a stop 52 that is urged by a pair of helical springs 53 against a surface 54, thus biasing the lug counterclockwise as seen in FIGS. 2 and 3. The stop 52 has a lip 55 that extends between the surface 54 and the midportion of the shaft 46. When the lug 34 pivots down against its bias, the stop lip 55 is urged toward the shaft 46. If the lip engages the shaft, the lug 34 can no longer pivot against the bias.

It can thus be seen that initial movement of the wedges 45 in the direction of the arrows shown in FIG. 5 brings the lip 55 closer to the shaft 46, and because the lug surface 54 engages the stop 52, and the stop lip 55 engages the shaft 46, this prevents further pivoting of the lug. The parts are in contact but not so tightly held together as to prevent slight pivoting movement of the lug 34. In this condition of the parts, the base plate 11 can be slid fore and aft on the support body 12, but cannot be separated from the support body. Even inadvertent physical pressure on the lug 32 will not move it down to release the base plate.

After the initial limiting of pivotal movement of the lug 34, further rotation of the knob 47 and thus movement of the wedges 45 will carry the lug 34 against the base plate 11 to clamp the base plate in its fore and aft adjusted position. In this clamped condition of the parts, the parts are tightly held together and prevent pivot movement of the lug 34. Thus, slight rotation of the knob 47 positions the wedges 45 so as to place the lug 34 into any one of three possible conditions. First, free to pivot against its bias so as to release the base plate. Second, to be locked against pivoting movement but to only loosely engage the base plate so that the base plate is locked on the support surface 32 but is free to be adjustably slid fore and aft. Third, to have the lug 34 clamped firmly against the base plate so that the latter is securely clamped on the support body.

When used with a panhead such as the panhead 60 having a web 61 supporting a fluid casing at the side of the assembly, the lug 34 is formed with a notch 62 so that it can be moved down with the notch 52 straddling the web 61. This provides a further safety feature in that the notch 52 will not fit over the web unless the support body 12 is level on the panhead. If not level, interference between the lug and the web 61 prevents the lug 34 from unlocking. Therefore, connection and disconnection can only be accomplished if the plate 11 and the attached camera is in a level position.

Operation of the assembly 10 can now be readily seen and appreciated by those skilled in this art. Initially, the support body 12 is secured to the desired panhead which is mounted as desired. The base plate 11 is securely fixed to the bottom of the camera to be used. The operator, after assuring himself that the knob 47 has been rotated to free the lug 34 for downward pivoting movement, lifts the camera with this customarily being done from the left side of the camera with the lens pointing to the cameraman's left. Approaching the panhead, the camera is slightly tilted so that the base plate 11 engages the lugs 33 at virtually any point along the length of the base plate, and then the camera is rocked to a level position whereupon the base plate 11 will engage and press down the lug 34 against its bias. As the plate 11 settles onto the surface 32, the lug 34 will snap over the adjacent plate way 31, and the projection 36 will engage an overlying slot 37, whereupon the camera is virtually locked on the support body. A quick turn of the knob 47 will slightly shift the lug 34 so that it no longer can pivot downwardly, whereupon complete locking has been achieved. The cameraman may then slide his camera fore and aft on the support body 12 to a point of balance and further slight rotation of the knob 47 will securely clamp the plate 11 on the body 12.

Release of the camera can be easily achieved by grasping the camera, rotating the knob 47 the required fractional turn, pushing the lug 34 down with a thumb, and lifting the camera and the base plate 11 free from the support body 12 and the panhead.

I claim as my invention:

1. An instrument lock-plate assembly comprising, in combination, an elongated base plate adapted for being rigidly secured to the base of an instrument and having parallel tapered ways, a support body having an upper surface for receiving said base plate and opposed lugs with undercut surfaces to engage said tapered ways and define a tongue-in-groove mating engagement between said base plate and said support body, the lug on one side of said upper surface being movable with respect to said body and mounted for movement both down to the plane of the upper surface and above said upper surface toward the opposed lug, means for biasing said movable lug up from the plane of said upper surface so that said base plate can engage the fixed lugs, press the movable lug against said bias and have the movable lug snap above the adjacent way of the base plate when the plate rests on said upper surface, and means for manually moving said movable lug above said surface toward the opposed lug so as to clamp the base plate between said lugs and against said upper surface.

2. The combination of claim 1 in which there is projection and groove interfitting between said base plate and said support body when the plate is between said lugs on said upper surface so that the plate can be adjustably slid on said surface between limit positions without separating from the body.

3. The combination of claim 2 including a stop for engaging said movable lug and preventing it from moving against said bias, said means for manually moving said lug causing the lug to engage said stop before further movement clamps the base plate, whereby the base plate is locked to the support body but can be adjustably shifted relative to the support body.

4. The combination of claim 1 in which said support body has left and right lugs having transverse holes of a diameter for receiving the transverse portions of handle shafts, locking knobs mounted on said body for clamping said handle shaft portions within said holes, said holes being offset fore and aft of said body a distance greater than the diameter of said holes so that handle shafts can be fitted from either left or right into either one of said holes, thereby permitting a wide range of handle adjustments.

5. The combination of claim 1 in which said movable lug is pivoted on a member slidably mounted in said body, and said means for manually moving said lug includes a pair of wedges on a threaded shaft carrying a manually turned knob, so that turning said knob shifts said wedges to cam and slide said member in a straight line, thereby pulling said movable lug into clamping position.

6. The combination of claim 5 including a stop in said body cooperating with said movable lug so that initial movement of the wedges causes the lug to engage the stop and prevent pivoting of the lug prior to full clamping of the base plate.

* * * * *